(12) United States Patent
Ogawa et al.

(10) Patent No.: US 11,677,241 B2
(45) Date of Patent: Jun. 13, 2023

(54) POWER TRADING SYSTEM AND MANAGEMENT APPARATUS

(71) Applicant: HONDA MOTOR CO., LTD., Tokyo (JP)

(72) Inventors: Makoto Ogawa, Wako (JP); Kazumasa Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 17/206,327

(22) Filed: Mar. 19, 2021

(65) Prior Publication Data
US 2021/0305812 A1  Sep. 30, 2021

(30) Foreign Application Priority Data
Mar. 27, 2020 (JP) .............................. JP2020-058230

(51) Int. Cl.
*H02J 3/00* (2006.01)
*H02J 3/32* (2006.01)
(Continued)

(52) U.S. Cl.
CPC .............. *H02J 3/008* (2013.01); *G06Q 50/06* (2013.01); *H02J 3/322* (2020.01); *H02J 3/38* (2013.01);
(Continued)

(58) Field of Classification Search
CPC .... H02J 3/008; H02J 3/322; H02J 3/38; H02J 13/00006; H02J 2300/20; G06Q 50/06; Y02B 90/20; Y02P 90/84; Y04S 40/12
See application file for complete search history.

(56) References Cited

U.S. PATENT DOCUMENTS

2011/0276194 A1* 11/2011 Emalfarb ................ B60L 53/66
                                                          700/297
2013/0013123 A1*  1/2013 Ozaki ..................... G06Q 10/06
                                                          700/295
(Continued)

FOREIGN PATENT DOCUMENTS

CN       110633573 A     12/2019
JP     2019-161711 A      9/2019
(Continued)

OTHER PUBLICATIONS

Guille C et al.: "A conceptual framework for the vehicle-to-grid (V2G) implementation", Energy Policy, Elsevier, Amsterdam, NL, vol. 37, No. 11, Nov. 1, 2009 (Nov. 1, 2009), pp. 4379-4390, XP026691876 Cited in EP Office Action dated May 20, 2022.
(Continued)

Primary Examiner — Mohammad Ali
Assistant Examiner — Dhruvkumar Patel
(74) Attorney, Agent, or Firm — WHDA, LLP

(57) ABSTRACT

The present invention provides a power trading system that executes power trading between a plurality of apparatuses, wherein at least one apparatus of the plurality of apparatuses includes a management unit configured to manage electric energy of a battery, and the management unit manages the electric energy of the battery by discrimination between electric energy derived from exhaustible energy and electric energy derived from renewable energy.

9 Claims, 5 Drawing Sheets

(51) Int. Cl.
  *H02J 13/00*  (2006.01)
  *G06Q 50/06*  (2012.01)
  *H02J 3/38*  (2006.01)
(52) U.S. Cl.
  CPC ..... *H02J 13/00006* (2020.01); *H02J 2300/20* (2020.01)

(56) References Cited

U.S. PATENT DOCUMENTS

| | | | |
|---|---|---|---|
| 2019/0050949 | A1 | 2/2019 | Orsini |
| 2019/0353685 | A1* | 11/2019 | Almeida Cavoto . G06Q 20/145 |
| 2019/0372345 | A1* | 12/2019 | Bain .................. G06Q 30/0601 |

FOREIGN PATENT DOCUMENTS

| | | |
|---|---|---|
| JP | 2019-175416 A | 10/2019 |
| JP | 2019-175417 A | 10/2019 |
| JP | 2020-9334 A | 1/2020 |
| JP | 2020009334 A * | 1/2020 |
| WO | 2019/035527 A1 | 2/2019 |
| WO | WO-2019141511 A1 * | 7/2019 ............. G06Q 50/06 |

OTHER PUBLICATIONS

Hassija Vikas et al.: "A Blockchain-Based Framework for Lightweight Data Sharing and Energy Trading in V2G Network", IEEE Transactions on Vehicular Technology, IEEE, USA, vol. 69, No. 6, Jan. 16, 2020 (Jan. 16, 2020), pp. 5799-5812, XP011794224; Cited in EP Office Action dated May 20, 2022.
Liu Haiqing et al: "Electric Vehicle Power Trading Mechanism Based on Blockchain and Smart Contract in V2G Network", IEEE Access, vol. 7, pp. 160546-160558, XP011754204; Cited in EP Office Action dated May 20, 2022.
Office Action dated May 20, 2022, issued in counterpart to EP Application No. 21163611.3. (10 pages).
Extended European Search Report dated Aug. 12, 2021, issued in counterpart EP application No. 21163611.3. (8 pages).

\* cited by examiner

FIG. 5

| | Renewable Energy | | | | | | Exhaustible Energy | | | | | |
|---|---|---|---|---|---|---|---|---|---|---|---|---|
| | Sale | | Purchase | | Consumption | | Sale | | Purchase | | Consumption | |
| | Electric Energy | Price | Electric Energy | Price | Electric Energy | Amount of $CO_2$ Emissions | Electric Energy | Price | Electric Energy | Price | Electric Energy | Amount of $CO_2$ Emissions |
| | kWh | Yen/kWh | kWh | Yen/kWh | kWh | g | kWh | Yen/kWh | kWh | Yen/kWh | kWh | g |
| S1 | V2G APPARATUS 50-1 | 5 | 10 | 0 | 0 | – | – | 0 | 0 | 0 | 0 | – | – |
| S2,S3 | V2G APPARATUS 50-2 | 5 | 10 | 0 | 0 | – | – | 5 | 5 | 0 | 0 | – | – |
| S4 | V2G APPARATUS 50-3 | 0 | 0 | 0 | 0 | – | – | 0 | 0 | 10 | 20 | – | – |
| S5 | EV2 | – | – | – | – | 10 | 0 | – | – | – | – | 0 | 0 |

POWER TRADING SYSTEM AND MANAGEMENT APPARATUS

CROSS-REFERENCE TO RELATED APPLICATION(S)

This application claims priority to and the benefit of Japanese Patent Application No. 2020-058230 filed on Mar. 27, 2020, the entire disclosure of which is incorporated herein by reference.

BACKGROUND OF THE INVENTION

Field of the Invention

The present invention relates to a power trading system and a management apparatus.

Description of the Related Art

The V2G (Vehicle to Grid) business model, which automatically executes power interchange trading between electric vehicles and a power system network, is becoming widespread. Japanese Patent Laid-Open Nos. 2019-175416, 2019-175417, and 2019-161711 propose a distributed generated/stored power trading system and a carbon emissions trading system each of which is in cooperation with a blockchain technique with low possibility (for example, impossibility) of tampering and high reliability owing to a distributed ledger.

In recent years, there has been an increasing need for preferential use of renewable energy over exhaustible energy. In order to implement this, there is demand for a mechanism and system that can execute power trading for each power generation method.

SUMMARY OF THE INVENTION

The present invention provides, for example, a technique that enables execution of power trading for each power generation method.

According to one aspect of the present invention, there is provided a power trading system that executes power trading between a plurality of apparatuses, wherein at least one apparatus of the plurality of apparatuses includes a management unit configured to manage electric energy of a battery, and the management unit manages the electric energy of the battery by discrimination between electric energy derived from exhaustible energy and electric energy derived from renewable energy.

Further features of the present invention will become apparent from the following description of exemplary embodiments with reference to the attached drawings.

BRIEF DESCRIPTION OF THE DRAWINGS

FIG. 5 is a table showing an example of a distributed ledger (trading information).

DESCRIPTION OF THE EMBODIMENTS

Figure 1A:
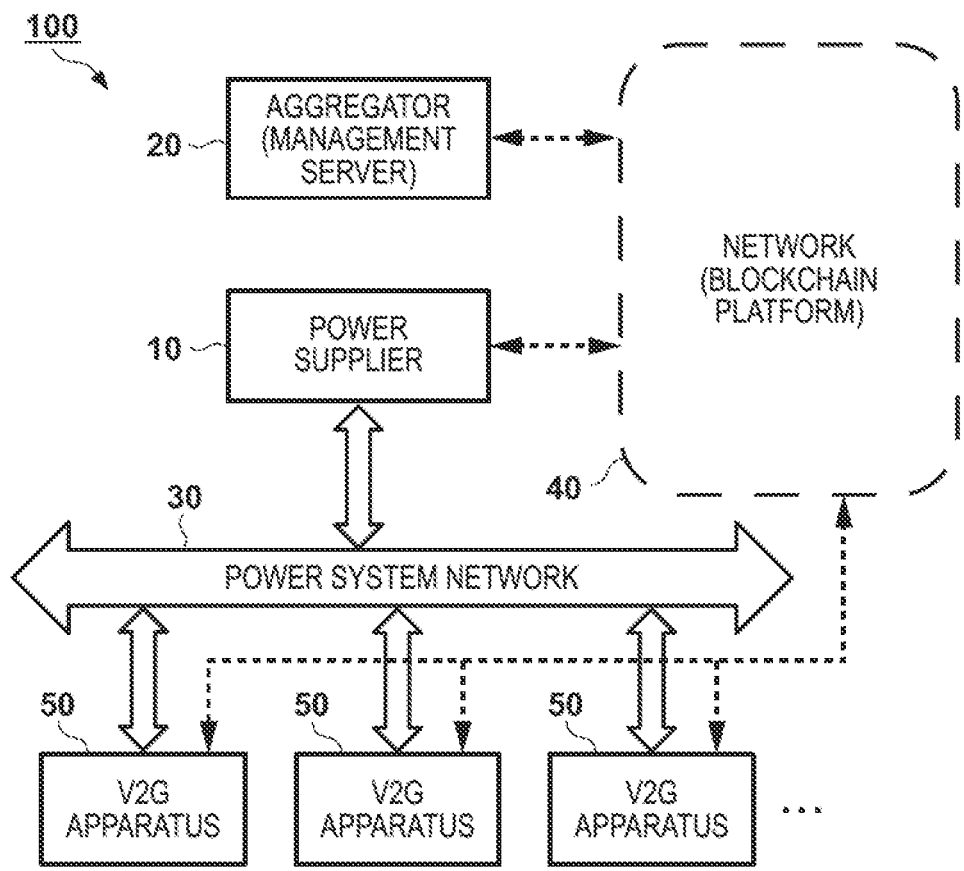
FIG. 1A is a block diagram showing an example of the overall arrangement of a VPP (V2G) system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

An embodiment of the present invention will be described. FIG. 1A is a block diagram showing an example of the overall arrangement of a VPP (Virtual Power Plant) system 100 according to this embodiment. In this embodiment, as the VPP system 100, a V2G (Vehicle to Grid) system will be exemplified. The VPP system 100 shown in FIG. 1A includes a power supplier 10, an aggregator (management server) 20, and a plurality of V2G apparatuses 50. In the example shown in FIG. 1A, a feeding path is indicated by a block arrow, and a communication path of information or data is indicated by a dashed arrow. Communication of information or data can be either wired or wireless.

The power supplier 10 is, for example, an electricity retailer or an electricity transmission and distribution utility, which supplies power to a plurality of customers via a power system network 30. In this embodiment, the power supplier 10 generates power derived from exhaustible energy and supplies it to the power system network 30. Exhaustible energy is, for example, energy such as fossil fuel including petroleum, coal, natural gas, and the like having limited reserves, or nuclear power using uranium or the like. A customer means a facility itself, such as a home or a factory that receives a VPP service, and in this embodiment, can include the V2G apparatus 50.

The aggregator 20 is located between the power supplier 10 and the plurality of customers (the plurality of V2G apparatuses 50) and provides the VPP service to the customers. For example, the aggregator 20 can function as a management server that integrates/controls the energy management systems of the plurality of customers (the plurality of V2G apparatuses 50) in a predetermined region via a network 40 and constructs the VPP system. The aggregator 20 acquires the operation plan of the power units according to a request of a power demand in a power market from the power supplier 10 via the network 40, and operates the plurality of V2G apparatuses 50 in accordance with the operation plan.

The operation of respective V2G apparatuses 50 via the aggregator 20 to adjust the power demand and supply in the power market is also called a demand response (DR). The demand response (DR) includes a "down DR" and an "up DR". The "down DR" means keeping the demand and supply balance of power by suppressing power consumption of customers or performing discharge from the batteries or power generation equipment of customers to the power system network 30, and is also called negawatt trading. On the other hand, the "up DR" means keeping the demand and supply balance of power by increasing power consumption of customers, and is also called posiwatt trading.

Figure 1B:
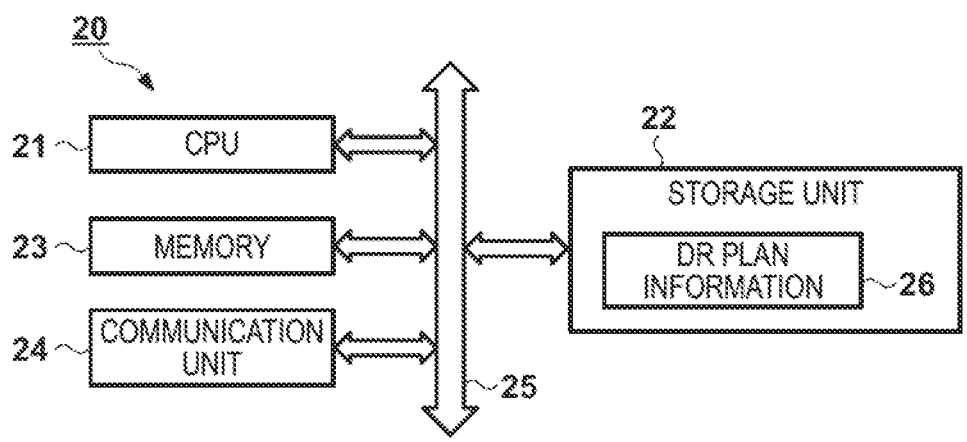
FIG. 1B is a block diagram showing an example of the arrangement of an aggregator.

FIG. 1B is a block diagram showing an example of the arrangement of the aggregator 20 (management server). The aggregator 20 includes, for example, a CPU 21, a storage unit 22, a memory 23, and a communication unit 24, and the units are communicably connected to each other via a system bus 25. The CPU 21 comprehensively controls the aggregator 20 by, for example, reading out a program stored in the storage unit 22 to the memory 23 and executing it. The storage unit 22 stores not only basic programs and data used by the aggregator 20 to operate but also information and data acquired from the power supplier 10 and each V2G apparatus 50. The communication unit 24 is an interface that enables communication with the network 40. In this embodiment, the CPU 21 of the aggregator 20 acquires information (DR plan information 26) concerning a DR plan from the power supplier 10 by the communication unit 24 via the network 40, and stores the acquired DR plan information 26 in the storage unit 22. Also, the CPU 21 transmits the DR plan information 26 to each V2G apparatus 50, and operates each V2G apparatus 50 based on the DR plan information.

The V2G apparatus 50 is an apparatus that controls charge/discharge (charge and/or discharge) of the battery or supplies power generated by a renewable energy power generation equipment to the power system network 30. That is, the V2G apparatus 50 can include a battery charge/discharge equipment and/or a renewable energy power generation equipment. In addition, the V2G apparatus 50 according to this embodiment has a function as a management apparatus that manages the electric energy of the battery. Here, renewable energy is energy in the natural world that can be used sustainably, such as solar power, wind power, geothermal power, or hydropower. Solar power energy will be exemplified below as renewable energy.

Figure 2:
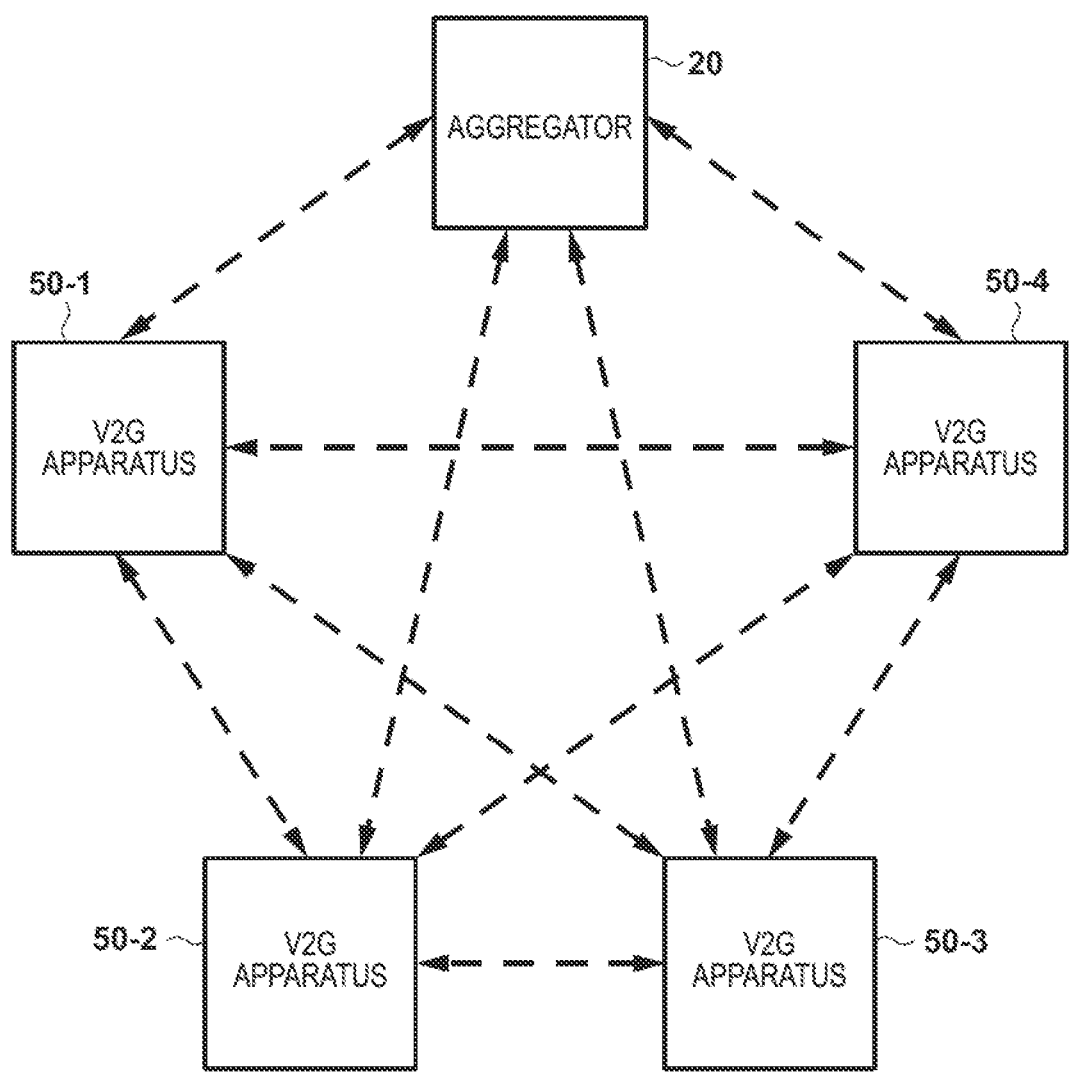
FIG. 2 is a conceptual view showing a power trading system (power trading platform)

Next, a power trading system (power interchange trading system) according to this embodiment will be described. FIG. 2 is a conceptual view showing the power trading system (power trading platform) according to this embodiment. FIG. 2 shows an example in which the power trading system is formed by the aggregator 20 and four V2G apparatuses 50-1 to 50-4, but the number of the V2G apparatuses 50 is not limited to four and may be two, three, or five or more. In this embodiment, the aggregator 20 and the plurality of V2G apparatuses 50 are connected to each other by peer-to-peer (P2P) such that they can directly trade power with each other, and share power trading information (distributed ledger) using a blockchain technique (distributed ledger technique). Further, each V2G apparatus 50 manages the electric energy of the battery by discrimination between the electric energy derived from exhaustible energy and the electric energy derived from renewable energy. For example, each V2G apparatus 50 manages the trading (sale and purchase) of the electric energy of the battery by discrimination between the electric energy derived from exhaustible energy and the electric energy derived from renewable energy, and shares the traded electric energy as the trading information (distributed ledger) with the plurality of V2G apparatuses 50.

Figure 3:
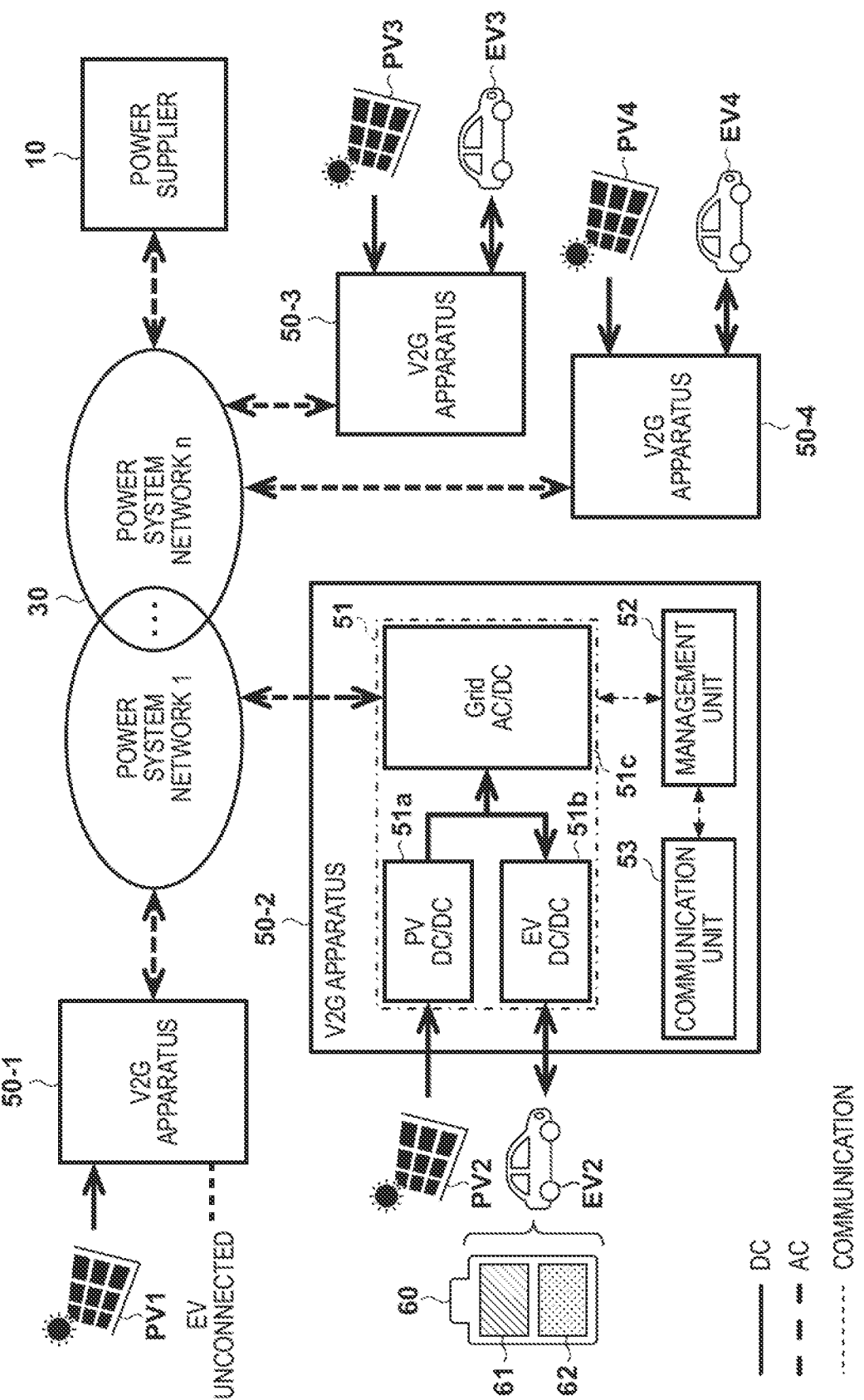
FIG. 3 is a conceptual view showing an example of power trading in the power trading system.

FIG. 3 is a conceptual view showing an example of power trading in the power trading system according to this embodiment. FIG. 3 illustrates the four V2G apparatuses 50-1 to 50-4, but the number of the V2G apparatuses 50 is not limited to four and may be two, three, or five or more. Further, in FIG. 3, each of the plurality of V2G apparatuses 50 includes the charge/discharge equipment of a battery 60 and a renewable energy power generation equipment, but the present invention is not limited to this. Each V2G apparatus 50 may include only the charge/discharge equipment of the battery 60, or may include only the renewable energy power generation equipment. Furthermore, FIG. 3 illustrates a battery mounted on an electric vehicle EV as the battery 60 to be managed by each V2G apparatus 50, but the present invention is not limited to this, and a stationary battery may be used. A solar power generation equipment PV is illustrated as the renewable energy power generation equipment, but the present invention is not limited this, and a power generation equipment using wind power, geothermal power, hydropower, or the like may be used.

Each V2G apparatus 50 can include, for example, a power control unit 51, a management unit 52, and a communication unit 53. FIG. 3 shows the arrangement of the V2G apparatus 50-2, and each of the V2G apparatuses 50-1, 50-3, and 50-4 can have the arrangement similar to that of the V2G apparatus 50-2. The power control unit 51 can include, for example, a DC/DC converter 51a for the solar power generation equipment PV (PV DC/DC), a DC/DC converter 51b for the electric vehicle EV (EV DC/DC), and an AC/DC converter 51c (Grid AC/DC).

The DC/DC converter 51a regulates (boosts or steps down) the voltage of the power (DC voltage) generated by the solar power generation equipment PV, and supplies the power to the DC/DC converter 51b and/or the AC/DC converter 51c. The DC/DC converter 51b can be, for example, a charge/discharge equipment that controls charge/discharge of the electric vehicle EV. The DC/DC converter 51b regulates the voltage of the power (DC voltage) supplied from the DC/DC converter 51a or the AC/DC converter 51c, and charges the electric vehicle EV with the power. Further, the DC/DC converter 51b regulates the voltage of the power (DC voltage) discharged from the electric vehicle EV, and supplies the power to the AC/DC converter 51c.

The AC/DC converter 51c converts the power (DC voltage) supplied from the DC/DC converter 51a or 51b into an AC voltage and supplies it to the power system network 30. Further, the AC/DC converter 51c converts the power (AC voltage) supplied from the power system network 30 into a DC voltage and supplies it to the DC/DC converter 51b.

The management unit 52 is formed from a processor represented by a CPU, a storage device such as a semiconductor memory, an interface with an external device, and the like, and manages power trading (demand and supply) based on the distributed ledger (trading information) shared by the plurality of V2G apparatuses 50. The communication unit 53 is an interface that enables communication with the network 40 (blockchain platform).

In this embodiment, the management unit 52 manages the electric energy of the battery 60 by discrimination between electric energy 61 derived from exhaustible energy (for example, power generated by the power supplier) and electric energy 62 derived from renewable energy (for example, power generated by the solar power generation equipment). Further, the management unit 52 calculates the trading (demand and supply) of the electric energy in the battery 60 by discrimination between the electric energy 61 derived from exhaustible energy and the electric energy 62 derived from renewable energy, writes each calculated electric energy in the distributed ledger (trading information), and transmits them to the network 40 (blockchain platform) by the communication unit 53.

Here, it is impossible in practice to divide the electric energy of the battery 60 into the electric energy derived from exhaustible energy and the electric energy derived from renewable energy and hold them in the battery 60. Therefore, "manage by discrimination" in this embodiment indicates that the calculated value of the power generated using either of exhaustible energy and renewable energy is stored as the electric energy. For example, based on the electric energy generated by the solar power generation equipment PV and supplied to the power system network 30, if at least part of the electric energy is currently charged in the battery 60, the electric energy calculated in this case can be managed (stored) as the electric energy derived from renewable energy. On the other hand, if the electric energy exceeding the electric energy generated by the solar power generation equipment PV and supplied to the power system network 30 is currently charged in the battery, the electric energy of the "exceeding amount" calculated in this case can be managed (stored) as the electric energy derived from exhaustible energy.

By managing the electric energy of the battery 60 as has been described above, the management unit 52 can calculate, based on the information concerning the electric energy 61 derived from exhaustible energy and the electric energy 62 derived from renewable energy stored in the battery 60, the amount of $CO_2$ emissions from the electric energy of the battery 60 consumed by traveling of the electric vehicle EV or the like. Then, the management unit 52 writes the calculated amount of $CO_2$ emissions in the distributed ledger (trading information) and transmits it to the network 40 (blockchain platform) by the communication unit 53. Here, the management unit 52 may manage the electric energy of the battery 60 consumed by traveling of the electric vehicle EV or the like such that the power derived from renewable energy is preferentially consumed over the power derived from exhaustible energy.

Figure 4:
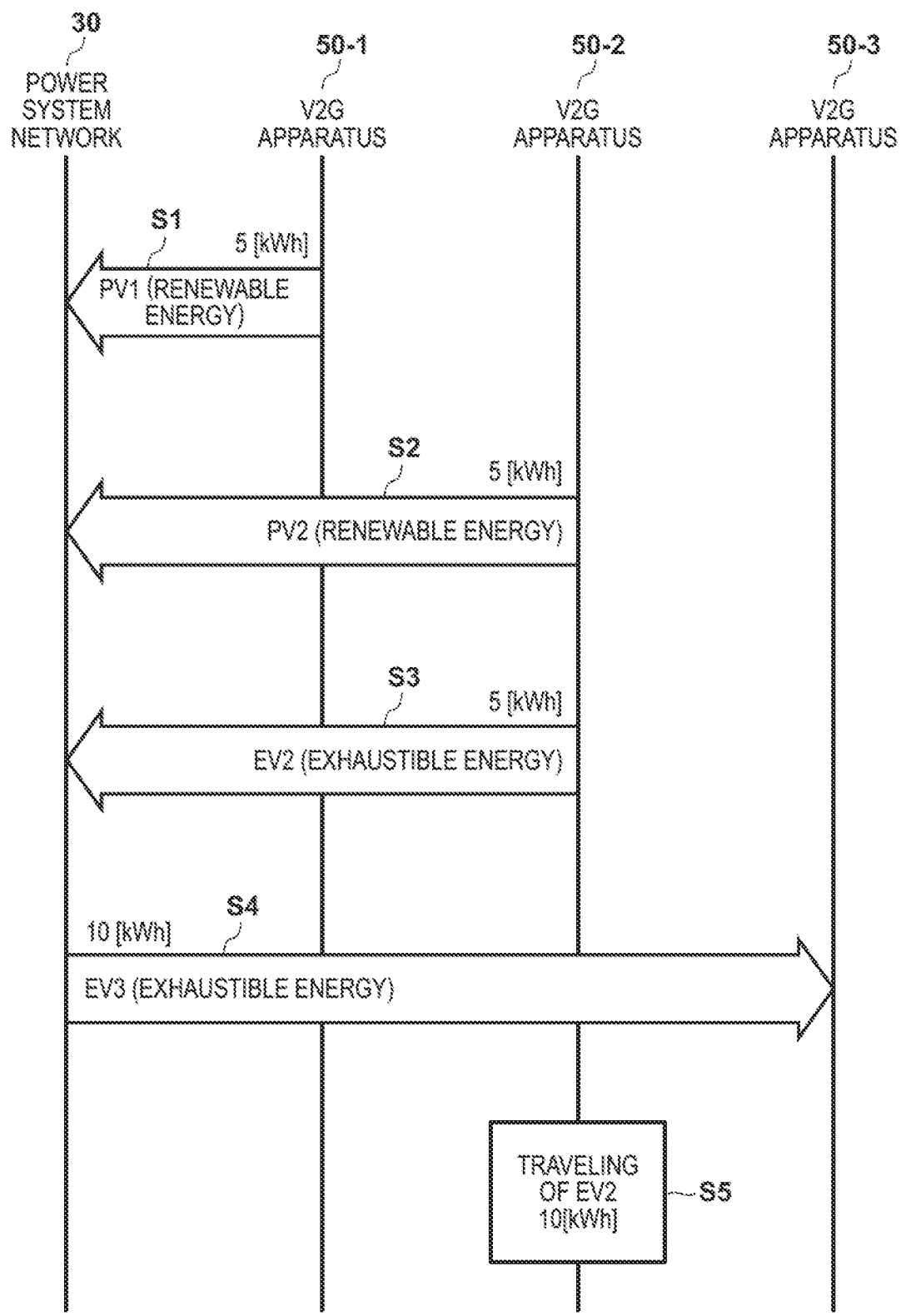
FIG. 4 is a sequence chart showing examples of power trading.

Next, examples of power trading in the power trading system according to this embodiment will be described with reference to FIGS. 4 and 5. FIG. 4 is a sequence chart showing examples of trading (examples of selling/purchasing) of power. FIG. 5 is a table showing an example of the distributed ledger (trading information) in which the electric energy, the price, and the amount of $CO_2$ emissions calculated by the management unit 52 of each V2G apparatus 50 are written, and shows an example in which the electric energy, the price, and the amount of $CO_2$ emissions corresponding to each of steps S1 to S5 shown in FIG. 4 are written.

Step S1 shows an example in which the V2G apparatus 50-1 sells the power (electric energy of 5 kWh) generated by the solar power generation equipment PV1. Since the power to be sold in this example is power derived from renewable energy, the management unit 52 of the V2G apparatus 50-1 writes "5 kWh" in the "sale" column of renewable energy in the distributed ledger as shown in FIG. 5, and transmits it to the network 40 (blockchain platform) by the communication unit 53. Here, the sales price of power derived from renewable energy fluctuates appropriately in accordance with the balance between demand and supply of power. If the supply amount (sales amount) of power is large, the sales price can be low, and if the demand amount (purchase amount) of power is large, the sales price can be high. In the example shown in FIG. 5, the sales price of power derived from exhaustible energy is set at 10 yen/kWh.

Step S2 shows an example in which the V2G apparatus 50-2 sells the power (electric energy of 5 kWh) generated by the solar power generation equipment PV2. Since the power to be sold in this example is power derived from renewable energy, the management unit 52 of the V2G apparatus 50-2 writes "5 kWh" in the "sale" column of renewable energy in the distributed ledger as shown in FIG. 5, and transmits it to the network 40 (blockchain platform) by the communication unit 53. Step S3 shows an example in which the V2G apparatus 50-2 sells part (electric energy of 5 kWh) of the electric energy stored in the battery 60 of the electric vehicle EV. Since the power to be sold in this example is power derived from exhaustible energy, the management unit 52 of the V2G apparatus 50-2 writes "5 kWh" in the "sale" column of exhaustible energy in the distributed ledger as shown in FIG. 5, and transmits it to the network 40 (blockchain platform) by the communication unit 53. Here, similar to renewable energy, the sales price of power derived from exhaustible energy fluctuates appropriately in accordance with the balance between demand and supply of power. The sales price of power derived from exhaustible energy is set lower than the sales price of power derived from renewable energy, and it is set at 5 yen/kWh in the example shown in FIG. 5.

Step S4 shows an example in which the V2G apparatus 50-3 purchases power (electric energy of 10 kWh). Since the power to be purchased in this example is power derived from exhaustible energy, the management unit 52 of the V2G apparatus 50-3 writes "10 kWh" in the "purchase" column of exhaustible energy in the distributed ledger as shown in FIG. 5, and transmits it to the network 40 (blockchain platform) by the communication unit 53. Here, the purchase price of power derived from exhaustible energy and the purchase price of power derived from renewable energy fluctuate appropriately in accordance with the balance between demand and supply of power. The purchase price of power derived from exhaustible energy is set lower than the purchase price of power derived from renewable energy, and it is set at 20 yen/kWh in the example shown in FIG. 5.

Step S5 shows an example in which the electric vehicle EV managed by the V2G apparatus 50-2 has consumed the power of the battery 60. The management unit 52 of the V2G apparatus 50-2 manages the power such that the power derived from renewable energy is preferentially consumed over the power derived from exhaustible energy. In this example, the management unit 52 calculates that the electric vehicle EV has consumed the power derived from renewable energy by 10 kWh. In addition, the management unit 52 calculates the amount of $CO_2$ emissions from the power consumed by the electric vehicle EV. The amount of $CO_2$ emissions can be calculated based on, for example, the use amount of fuel, and no $CO_2$ emissions are basically generated if power derived from renewable energy is consumed. In this example, since it is assumed that the electric vehicle EV uses only the power derived from renewable energy and uses no power derived from exhaustible energy, the management unit 52 calculates the amount of $CO_2$ emissions to be "0 g". Then, as shown in FIG. 5, the management unit 52 writes "10 kWh" in the "consumption" column of renewable energy in the distributed ledger, writes "0 g" in the "amount of $CO_2$ emissions" column of renewable energy, and transmits them to the network 40 (blockchain platform) by the communication unit 53.

As has been described above, in the power trading system according to this embodiment, each V2G apparatus 50 manages the electric energy of the battery 60 by discrimination between the electric energy derived from exhaustible energy and the electric energy derived from renewable energy. This enables automatic execution of power interchange trading for each power generation method (type of electricity), and the need for preferential use of renewable energy over exhaustible energy can be met. In addition, the amount of $CO_2$ emissions by power consumption of the battery (for example, the amount of $CO_2$ emissions by Well-to-Wheel in traveling of the electric vehicle EV) can be appropriately calculated, so that visualization of environmental contribution and automatic execution of carbon emissions trading are enabled.

Here, in this embodiment, it is configured that the management unit 52 of each V2G apparatus 50 performs processing of managing the electric energy of the battery 60 by discrimination between the electric energy derived from exhaustible energy and the electric energy derived from renewable energy, but the present invention is not limited to this. The processing may be performed by the processor (ECU) of the electric vehicle EV (power unit), or may be performed by the CPU 21 of the aggregator 20 (management server). That is, at least one of the processor of the electric vehicle EV (power unit) and the CPU 21 of the aggregator 20 (management server) may have the function of the management unit 52 of the V2G apparatus 50 according to this embodiment.

Further, in this embodiment, the battery of the electric vehicle EV has been exemplified as the battery 60, but a stationary battery may be applied as the battery 60. That is, in the example shown in FIG. 3, at least one of the electric vehicles EV may be replaced with a stationary battery, or one V2G apparatus may manage both the electric vehicle EV and a stationary battery. In this case, the processing of managing the electric energy of the battery by discrimination between the electric energy derived from exhaustible energy and the electric energy derived from renewable energy may be performed by the management unit 52 of the V2G apparatus 50, may be performed by a processor (CPU) built in the stationary battery, or may be performed by the CPU 21 of the aggregator 20 (management server).

OTHER EMBODIMENTS

In the embodiment described above, it is sometimes unknown whether part of the electric energy charged in a battery 60 (the battery of an electric vehicle EV or a stationary battery) is the electric energy derived from exhaustible energy or the electric energy derived from renewable energy. For example, if the battery 60 is charged using a charger out of management of a V2G apparatus 50 (management unit 52), the derivation of the charged electric energy can be unknown. In this case, the management unit 52 manages, as the "electric energy of unknown derivation", the electric energy which is unknown as to whether it has been derived from exhaustible energy or renewable energy. The management unit 52 may write the "electric energy of unknown derivation" in the distributed ledger (trading information) and transmit it to a network 40 (blockchain platform) by a communication unit 53, but can manage the "electric energy of unknown derivation" as the electric energy out of the power trading.

<Summary of Embodiments>

1. A power trading system according to the above embodiment is a power trading system that executes power trading between a plurality of apparatuses (for example, 50),
wherein at least one apparatus of the plurality of apparatuses includes a management unit (for example, 52) configured to manage electric energy of a battery, and
the management unit manages the electric energy of the battery by discrimination between electric energy (for example, 61) derived from exhaustible energy and electric energy (for example, 62) derived from renewable energy.

According to this embodiment, automatic execution of power interchange trading for each power generation method (type of electricity) becomes possible, and the need for preferential use of renewable energy over exhaustible energy can be met. In addition, visualization of environmental contribution by power consumption of the battery and automatic execution of carbon emissions trading are enabled.

2. In the above embodiment,
the management unit manages the electric energy of the battery such that power derived from renewable energy is preferentially consumed.

According to this embodiment, it is possible to perform battery management that meets the need for preferential use of renewable energy over exhaustible energy.

3. In the above embodiment,
the management unit calculates, based on information concerning the electric energy derived from exhaustible energy and the electric energy derived from renewable energy which are discriminatively managed as the electric energy of the battery, an amount of $CO_2$ emissions by power consumption of the battery.

According to this embodiment, it is possible to appropriately calculate the amount of $CO_2$ emissions by power consumption of the battery (for example, the amount of $CO_2$ emissions by Well-to-Wheel in traveling of an electric vehicle), so that visualization of environmental contribution and automatic execution of carbon emissions trading are enabled.

4. In the above embodiment,
the plurality of apparatuses share power trading information using a blockchain technique.

According to this embodiment, automatic execution of power interchange trading for each power generation method (type of electricity) is enabled, and visualization of environmental contribution by power consumption of the battery and automatic execution of carbon emissions trading are also enabled.

5. In the above embodiment,
the management unit manages, as electric energy of unknown derivation, the electric energy which is unknown as to whether it has been derived from exhaustible energy or renewable energy, and excludes the electric energy of unknown derivation from power trading using the blockchain technique.

According to this arrangement, it is possible to appropriately manage the electric energy of the battery based on the electric energy which is unknown as to whether it has been derived from exhaustible energy or renewable energy.

6. In the above embodiment,
at least one apparatus of the plurality of apparatuses includes a renewable energy power generation equipment (for example, PV).

According to this embodiment, automatic execution of interchange trading of power generated by the renewable energy power generation equipment is enabled.

7. In the above embodiment,
the battery is at least one of a battery mounted in an electric vehicle and a stationary battery.

According to this embodiment, it is possible to manage, for each power generation method (type of electricity), the electric energy of at least one of the battery and the stationary battery, which is consumed by the electric vehicle.

8. A management apparatus according to the above embodiment is a management apparatus (for example, 50) that manages electric energy of a battery, (for example, 60), the apparatus comprising
a unit (for example, 52) configured to manage the electric energy of the battery by discrimination between electric energy derived from exhaustible energy and electric energy derived from renewable energy.

According to this embodiment, it becomes possible to manage the electric energy of the battery for each power generation method (type of electricity), so that the need for preferential use of renewable energy over exhaustible energy can be met. In addition, visualization of environmental contribution by power consumption of the battery and automatic execution of carbon emissions trading are enabled.

The invention is not limited to the foregoing embodiments, and various variations/changes are possible within the spirit of the invention.

What is claimed is:

1. A power trading system that executes power trading, comprising:
   a power supplier configured to generate power derived from exhaustible energy and supply the generated power to a power system network;
   a plurality of apparatuses, each of which is connected to a renewable energy power generation equipment configured to generate power derived from renewable energy, and controls charge of a battery by power supplied from the power supplier via the power system network and/or power supplied from the renewable energy power generation equipment,
   wherein
   each of the plurality of apparatuses includes a management unit configured to manage electric energy charged in the battery,
   the management unit manages the electric energy charged in the battery, such that electric energy derived from exhaustible energy and electric energy derived from renewable energy are discriminated from each other, and
   the management unit calculates, based on information concerning electric energy derived from exhaustible energy and electric energy derived from renewable energy which are discriminatively managed as the electric energy charged in the battery, an amount of $CO_2$ emissions from power consumption of the electric energy charged in the battery by assuming that electric energy derived from renewable energy is preferentially consumed over electric energy derived from exhaustible energy among the electric energy charged in the battery.

2. The system according to claim 1, wherein
   the management unit manages the electric energy charged in the battery by assuming that electric energy derived from renewable energy is preferentially consumed over electric energy derived from exhaustible energy among the electric energy charged in the battery.

3. The system according to claim 1, wherein
   the plurality of apparatuses share power trading information using a blockchain technique.

4. The system according to claim 3, wherein
   the management unit manages, as electric energy of unknown derivation, the electric energy which is unknown as to whether it has been derived from exhaustible energy or renewable energy, and excludes the electric energy of unknown derivation from power trading using the blockchain technique.

5. The system according to claim 1, wherein
   each of the plurality of apparatuses supply, to the power system network, power generated by the renewable energy power generation equipment.

6. The system according to claim 1, wherein
   the battery is at least one of a battery mounted in an electric vehicle and a stationary battery.

7. An apparatus that is connected to a renewable energy power generation equipment configured to generate power derived from renewable energy, comprising
   a power control unit configured to control charge of a battery by power supplied from a power supplier via a power system network and/or power supplied from the renewable energy power generation equipment; and
   a management unit configured to manage electric energy charged in the battery,
   wherein
   the management unit manages the electric energy charged in the battery, such that electric energy derived from exhaustible energy and electric energy derived from renewable energy are discriminated from each other, and
   the management unit calculates, based on information concerning the electric energy derived from exhaustible energy and the electric energy derived from renewable energy which are discriminatively managed as the electric energy charged in the battery, an amount of $CO_2$ emissions from power consumption of the electric energy charged in the battery by assuming that electric energy derived from renewable energy is preferentially consumed over electric energy derived from exhaustible energy among the electric energy charged in the battery.

8. The system according to claim 1, wherein
   each of the plurality of apparatuses further includes a power control unit configured to control charge of a battery by power supplied from the power system network,
   the management unit manages electric energy charged in the battery, based on power trading information, and
   the power trading information is shared between the plurality of apparatuses, and includes information of electric energy supplied from the renewable energy power generation equipment to the power system network for each of the plurality of apparatuses.

9. The system according to claim 8, wherein
   the management unit manages electric energy charged in the battery, base on power trading information, such that in a case where electric energy charged in the battery exceeds electric energy supplied from the renewable energy power generation equipment to the power system network, a exceeding part of the electric energy charged in the battery is managed as electric energy derived from exhaustible energy, and the other part of the electric energy charged in the battery is managed as electric energy derived from renewable energy.

* * * * *